United States Patent
Minagawa et al.

(10) Patent No.: US 11,448,805 B2
(45) Date of Patent: Sep. 20, 2022

(54) OPTICAL MEMBER, METHOD OF MANUFACTURING OPTICAL MEMBER, AND IMAGE DISPLAY SYSTEM

(71) Applicant: KYOCERA Corporation, Kyoto (JP)

(72) Inventors: Hiroyuki Minagawa, Yokohama (JP); Keita Yasuda, Kawasaki (JP); Masaki Fujiwara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 260 days.

(21) Appl. No.: 16/328,593

(22) PCT Filed: Aug. 22, 2017

(86) PCT No.: PCT/JP2017/029948
§ 371 (c)(1),
(2) Date: Feb. 26, 2019

(87) PCT Pub. No.: WO2018/043210
PCT Pub. Date: Mar. 8, 2018

(65) Prior Publication Data
US 2019/0187343 A1    Jun. 20, 2019

(30) Foreign Application Priority Data
Aug. 29, 2016  (JP) ............... JP2016-167400

(51) Int. Cl.
*G02B 5/08* (2006.01)
*G02B 5/09* (2006.01)
*G09F 9/00* (2006.01)
(Continued)

(52) U.S. Cl.
CPC ............ *G02B 5/0816* (2013.01); *G02B 3/08* (2013.01); *G02B 5/08* (2013.01); *G02B 5/09* (2013.01);
(Continued)

(58) Field of Classification Search
CPC ...... G02B 2027/0118; G02B 2027/012; G02B 2027/0123; G02B 2027/0194;
(Continued)

(56) References Cited

U.S. PATENT DOCUMENTS

| | | | | |
|---|---|---|---|---|
| 4,385,430 A | * | 5/1983 | Bartels | .................. H02S 40/44 29/458 |
| 5,321,779 A | * | 6/1994 | Kissa | ................ G02B 6/12002 385/129 |

(Continued)

FOREIGN PATENT DOCUMENTS

| | | |
|---|---|---|
| JP | 2005-003918 A | 1/2005 |
| JP | 2013-152305 A | 8/2013 |

(Continued)

*Primary Examiner* — Joseph P Martinez
*Assistant Examiner* — Vipin Patel
(74) *Attorney, Agent, or Firm* — Studebaker & Brackett PC (57) ABSTRACT

An optical member includes a light-transmissive substrate, which includes a substrate surface, and reflecting surfaces located inside the substrate and configured to reflect at least a portion of incident light. At least a portion of the reflecting surfaces is inclined relative to the substrate surface so as to collect at least a portion of the incident light.

13 Claims, 6 Drawing Sheets

(51) Int. Cl.
*G02B 27/01* (2006.01)
*G02B 3/08* (2006.01)

(52) U.S. Cl.
CPC ......... *G02B 27/01* (2013.01); *G02B 27/0101* (2013.01); *G09F 9/00* (2013.01); *G02B 2027/0118* (2013.01); *G02B 2027/0123* (2013.01)

(58) Field of Classification Search
CPC ..................... G02B 27/0018; G02B 27/01; G02B 27/0101; G02B 3/08; G02B 5/08; G02B 5/0816; G02B 5/09; G02B 5/1861; G09F 9/00
See application file for complete search history.

(56) References Cited

U.S. PATENT DOCUMENTS

| | | | |
|---|---|---|---|
| 7,656,585 B1 * | 2/2010 | Powell | G02B 27/144 359/630 |
| 10,095,028 B2 | 10/2018 | Matsushita | |
| 10,365,489 B2 | 7/2019 | Sekiguchi et al. | |
| 2002/0018279 A1 | 2/2002 | Molsen | |
| 2003/0035231 A1 * | 2/2003 | Epstein | G02B 5/0242 359/834 |
| 2004/0005436 A1 * | 1/2004 | Mori | B29C 45/14811 428/141 |
| 2013/0140463 A1 * | 6/2013 | Myrick | G01N 21/55 250/341.8 |
| 2013/0229712 A1 | 9/2013 | Kress | |
| 2014/0036359 A1 * | 2/2014 | Jeon | G03B 21/60 359/459 |
| 2016/0327792 A1 | 11/2016 | Matsushita | |
| 2017/0153452 A1 * | 6/2017 | Matsushita | G02B 3/08 |
| 2017/0322417 A1 | 11/2017 | Sekiguchi et al. | |

FOREIGN PATENT DOCUMENTS

| | | |
|---|---|---|
| JP | 2015-161732 A | 9/2015 |
| WO | 2014/041691 A1 | 3/2014 |
| WO | 2016088389 A1 | 6/2016 |

* cited by examiner

OPTICAL MEMBER, METHOD OF MANUFACTURING OPTICAL MEMBER, AND IMAGE DISPLAY SYSTEM

CROSS-REFERENCE TO RELATED APPLICATION

The present application claims priority to and the benefit of Japanese Patent Application No. 2016-167400 filed Aug. 29, 2016, the entire contents of which are incorporated herein by reference.

TECHNICAL FIELD

The present disclosure relates to an optical member, a method of manufacturing an optical member, and an image display system.

BACKGROUND

A head-up display for projecting image light onto the front windshield of a moveable body and displaying an enlarged virtual image is known.

SUMMARY

An optical member according to an embodiment of the present disclosure includes a light-transmissive substrate, which includes a substrate surface, and a plurality of reflecting surfaces located inside the substrate and configured to reflect at least a portion of incident light. At least a portion of the plurality of reflecting surfaces is inclined at a predetermined angle relative to the substrate surface so as to collect at least a portion of the incident light.

A method, according to an embodiment of the present disclosure, of manufacturing an optical member includes forming a plurality of reflecting surfaces on an inclined face of a light-transmissive first substrate including a first surface and a second surface that is opposite the first surface and includes the inclined face. The inclined face is inclined relative to the first surface. The plurality of reflecting surfaces is configured to reflect at least a portion of incident light. At least a portion of the plurality of reflecting surfaces is inclined at a predetermined angle relative to the first surface so as to collect at least a portion of the incident light. The method of manufacturing includes forming a second substrate on top of the second surface of the first substrate and the plurality of reflecting surfaces.

An image display system according to an embodiment of the present disclosure includes an optical member and an image display apparatus. The optical member includes a light-transmissive substrate, which includes a substrate surface, and a plurality of reflecting surfaces located inside the substrate and configured to reflect at least a portion of incident light. The image display apparatus is configured to emit image projection light onto the optical member to display a virtual image. At least a portion of the plurality of reflecting surfaces is inclined at a predetermined angle relative to the substrate surface so as to collect at least a portion of the incident light.

DETAILED DESCRIPTION

In head-up displays and other display apparatuses that allow a user to see a virtual image, the range over which the user can see the virtual image is limited if light is specularly reflected by the member on which light is projected. The range over which a virtual image can be seen may correspond to the size of the display apparatus. Demand exists for increasing the range over which a virtual image can be seen with a relatively small display apparatus.

An image display system 1 (see FIG. 1) according to an embodiment of the present disclosure is described below in detail with reference to the drawings. The drawings referred to below are schematic illustrations. The dimensional ratios and the like in the drawings do not necessarily match the actual dimensions.

First Embodiment

Figure 1:
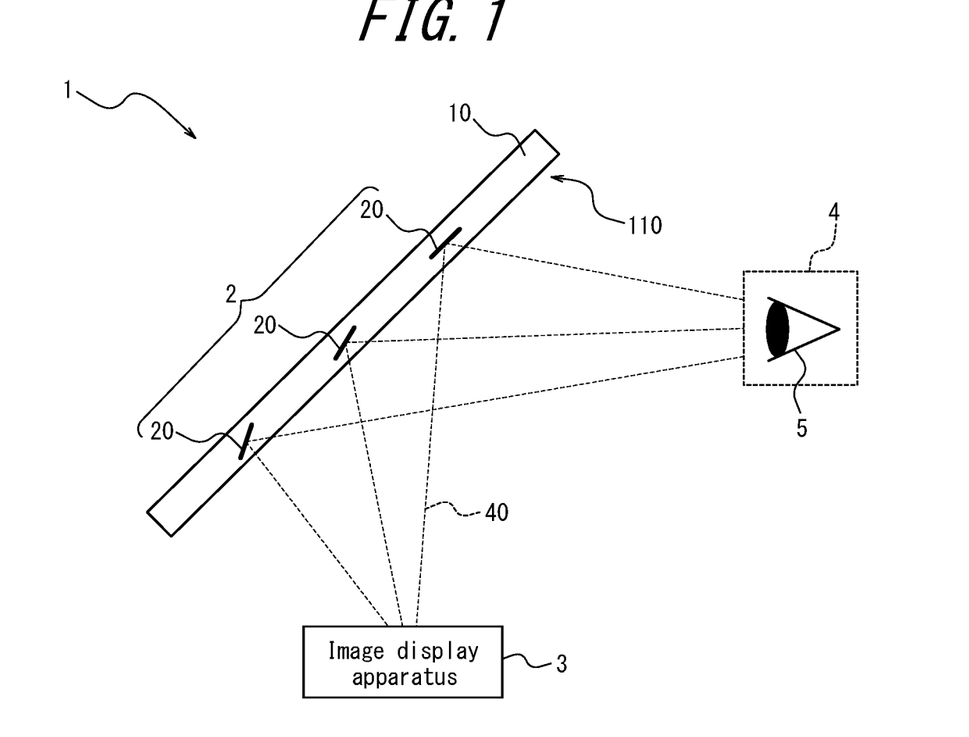
FIG. 1 illustrates an example configuration of an image display system according to a first embodiment.

As illustrated in FIG. 1, the image display system 1 according to the present embodiment includes an optical member 2 and an image display apparatus 3.

The optical member 2 includes a substrate 10 and a plurality of reflecting surfaces 20. The substrate 10 includes a substrate surface 110. The substrate 10 is light-transmissive and transmits at least a portion of light incident on the substrate 10. The substrate 10 may be a flat plate. The substrate 10 may have a curved surface. The substrate 10 may have any other shape. The substrate 10 may be flexible. At least a portion of the substrate 10 may be made of resin. The reflecting surface 20 reflects at least a portion of light incident on the substrate 10. At least a portion of the reflecting surfaces 20 is inclined with respect to the substrate surface 110. At least a portion of the reflecting surfaces 20 may be made of a material capable of reflecting light incident on the substrate 10. At least a portion of the reflecting surfaces 20 may be made of a metal material, such as aluminum, silver, or chrome.

Figure 2:
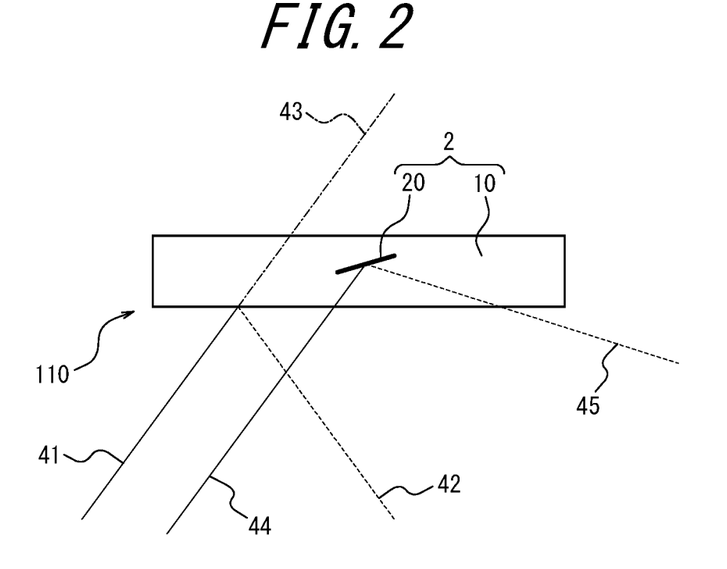
FIG. 2 illustrates an example of reflected light and transmitted light corresponding to incident light.

As illustrated in FIG. 2, when incident light 41 indicated by a solid line is incident on the substrate 10, at least a portion of the incident light 41 may be specularly reflected by the substrate surface 110 to become reflected light 42, indicated by a dashed line. At least a portion of the incident light 41 may be transmitted by the substrate 10 to become transmitted light 43, indicated by a dashed dotted line.

When incident light 44 indicated by a solid line is incident on the reflecting surface 20, at least a portion of the incident light 44 may be specularly reflected by the reflecting surface 20 to become reflected light 45, indicated by a dashed line. When the reflecting surface 20 is inclined relative to the substrate surface 110, the reflected light 45 proceeds in a different direction than the reflected light 42 reflected by the substrate surface 110. In other words, the reflected light 45 is reflected in a different direction than the direction of specular reflection relative to the substrate surface 110.

As illustrated in FIG. 1, the image display apparatus 3 emits image projection light 40, indicated by dashed lines, onto the optical member 2. At least a portion of the image projection light 40 can be reflected by the optical member 2. At least a portion of the reflected image projection light 40 can reach a virtually positioned eye box 4. The user of the image display system 1 can see a projection image, formed by the image projection light 40, as a virtual image when an eye 5 of the user is located in the eye box 4. The light transmitted through the optical member 2 can also reach the eye 5 of the user by virtue of the substrate 10 being light-transmissive. The user can see the background on the other side of the optical member 2 in overlap with the virtual image.

Figure 3:
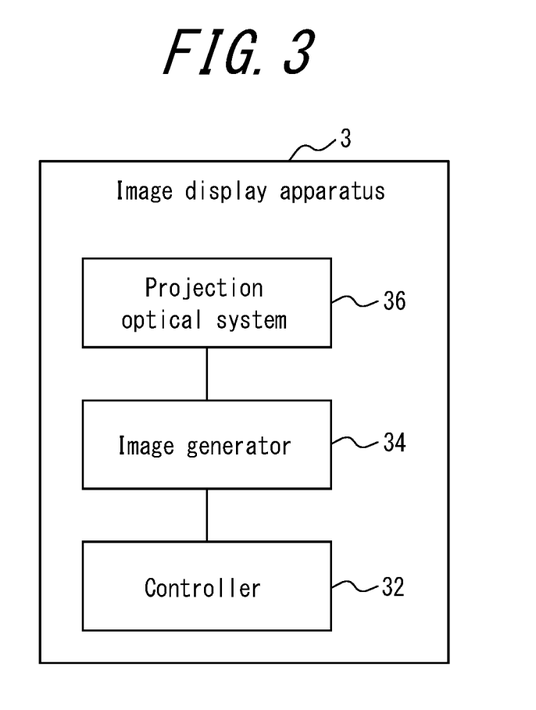
FIG. 3 is a functional block diagram illustrating an example schematic configuration of the image display apparatus in FIG. 1.

As illustrated in FIG. 3, the image display apparatus 3 includes a controller 32, an image generator 34, and a projection optical system 36.

The controller 32 controls the image generator 34 to project the image projection light 40 that forms the projection image. The controller 32 may generate image data pertaining to the projection image on the basis of information acquired from an external apparatus. The controller 32 may acquire image data pertaining to the projection image from an external apparatus. The controller 32 may, for example, be configured by a processor or microcomputer capable of executing application software.

The controller 32 may include a storage device storing various information, programs for operating the components of the image display apparatus 3, and the like. The storage device may, for example, be a semiconductor memory. The storage device may function as a working memory of the controller 32. The image display apparatus 3 may include the storage device as a storage unit.

The controller 32 may include a communication device for acquiring various information, image data, or the like from an external apparatus. The communication device may, for example, be a communication interface for a local area network (LAN), control area network (CAN), or the like. The communication device may be capable of communicating with an external apparatus in a wired or wireless manner. The image display apparatus 3 may include the communication device as a communication unit.

The image generator 34 may, for example, include a transmissive liquid crystal device such as a liquid crystal display (LCD) or a reflective liquid crystal device such as liquid crystal on silicon (LCOS). The image generator 34 may include a mirror device, such as a digital mirror device (DMD), a micro electro mechanical systems (MEMS) mirror, or the like. The image generator 34 may include a lamp, a light emission diode (LED), a laser, or the like as a light source. The light source may be used as a backlight of the liquid crystal display. The light source may be used for causing light to be incident on the mirror device. The image generator 34 may include a light-emitting device that is an inorganic electro-luminescence (EL) device, an organic EL device, or the like.

The projection optical system 36 reflects or refracts the image projection light 40 emitted from the image generator 34 to project the light onto the optical member 2. The projection optical system 36 may be a reflective optical system that includes convex or concave mirrors. The projection optical system 36 may be a refractive optical system that includes convex or concave lenses. The projection optical system 36 may be an optical system combining mirrors or lenses. The mirrors or lenses located in the projection optical system 36 may have a spherical surface shape in at least a portion thereof. The mirrors or lenses located in the projection optical system 36 may have an aspherical surface shape in at least a portion thereof. The mirrors or lenses located in the projection optical system 36 may have a surface shape corresponding to the shape of the optical member 2 in at least a portion thereof.

Figure 4:
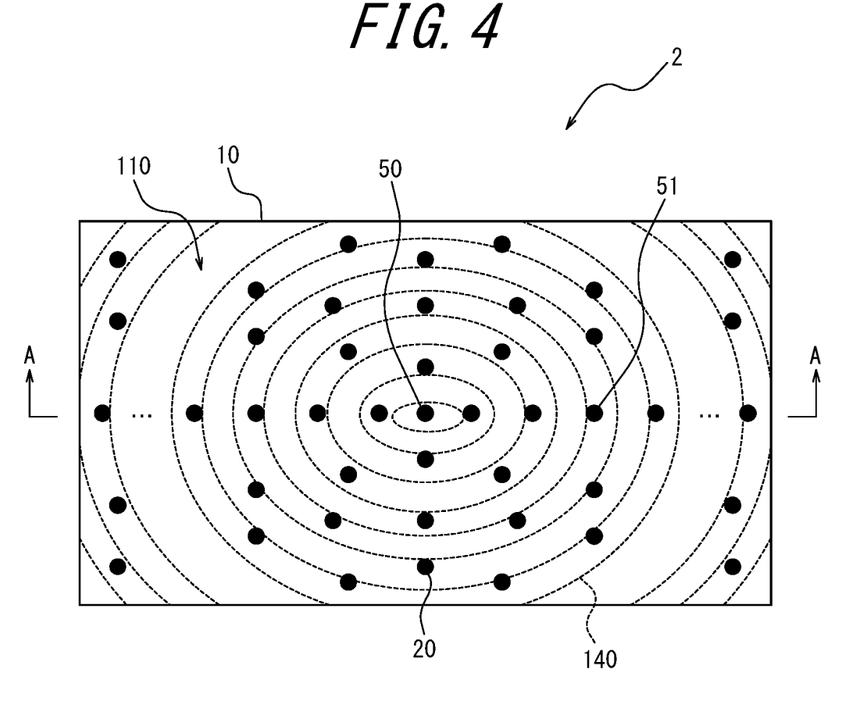
FIG. 4 is a plan view illustrating an example configuration of an optical member according to the first embodiment.
Figure 5:
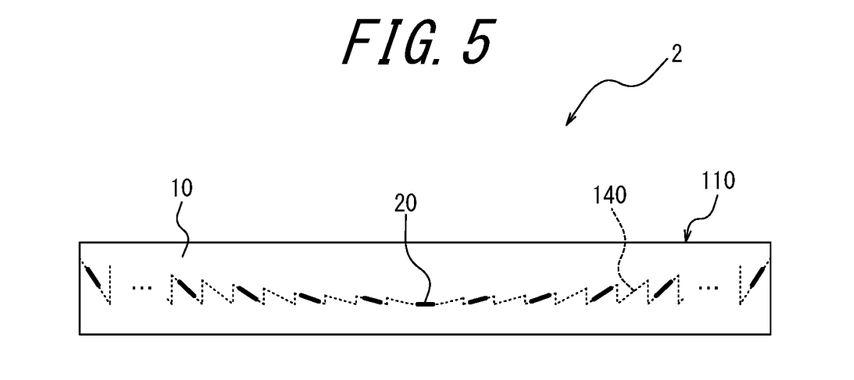
FIG. 5 is a cross-section along the A-A line in FIG. 4.

As illustrated in FIG. 4, the plurality of reflecting surfaces 20 represented by solid circles are distributed on the inside of the surface of the substrate 10. A virtual surface 140 that has a virtual surface shape is located inside the substrate 10. As illustrated in FIG. 5, at least a portion of the virtual surface 140 is inclined with respect to the substrate surface 110. At least a portion of the reflecting surfaces 20 is positioned to correspond to the surface shape of the virtual surface 140 and is inclined with respect to the substrate surface 110.

The virtual surface 140 may have a surface shape that collects at least a portion of incident light, incident on the virtual surface 140 from a predetermined direction, in a predetermined region. The predetermined region where light is collected by the virtual surface 140 is also referred to as a light-collection region.

The virtual surface 140 may be configured to include a plurality of annular surfaces that surround a reference point 50 virtually located on the substrate surface 110. At least a portion of the annular surfaces may be configured so that a normal to the annular surface is oriented towards the inside of the ring. The virtual surface 140 that includes a plurality of annular surfaces may have convex portions corresponding to ridge lines and concave portions corresponding to valley lines. The cross-sectional shape of the virtual surface 140 that includes a plurality of annular surfaces may have a sawtooth shape with peaks and valleys.

The reflecting surfaces 20 may be positioned to correspond to an annular surface configured so that a normal thereto is oriented towards the inside of the ring. The reflecting surfaces 20 may be positioned so as not to straddle a peak or valley of the virtual surface 140. This configuration facilitates control of the direction of light reflected by the reflecting surfaces 20. Ghosts caused by light reflected by the reflecting surfaces 20 can be suppressed. The reflecting surface 20 may be smaller in size than the width of the annular surface. This configuration makes the reflecting surface 20 less likely to straddle a peak or valley of the virtual surface 140.

Figure 6:
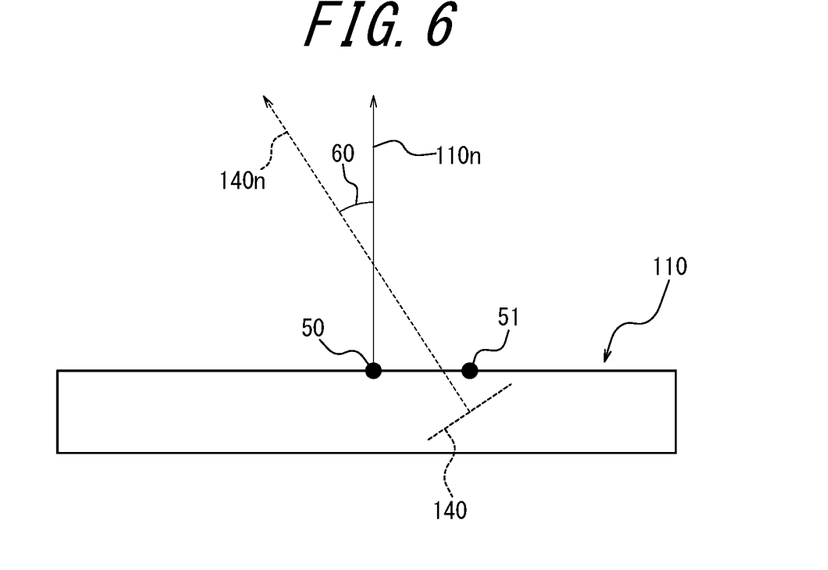
FIG. 6 illustrates the definition of the inclination angle of a virtual surface.

The virtual surface 140 may be configured so that the angle between the virtual surface 140 and the substrate surface 110 sequentially increases in accordance with distance from the reference point 50. In other words, the virtual surface 140 may be configured so that the angle between the virtual surface 140 and the substrate surface 110 at a location corresponding to a first point 51 virtually located on the substrate surface 110 sequentially increases in correspondence with increased distance between the reference point 50 and the first point 51. The angle between the virtual surface 140 and the substrate surface 110 is also referred to as the virtual surface inclination angle 60 (see FIG. 6). The virtual surface inclination angle 60 may be defined as the angle between a normal vector $110n$ to the substrate surface 110 at the reference point 50 and a normal vector $140n$ to the virtual surface 140 corresponding to the first point 51, as illustrated in FIG. 6, for example. The virtual surface inclination angle 60 may also be defined as the angle between (i) the orthographic projection of the normal vector $140n$ onto a reference plane that includes the normal vector $110n$ and the first point 51 and (ii) the normal vector $110n$.

The virtual surface 140 may, for example, have a Fresnel shape corresponding to a Fresnel lens. The Fresnel shape has concentric circular grooves centered on the reference point 50. Each groove includes a substantially perpendicular face and an inclined face that has a predetermined width. The inclined face has a greater inclination as the inclined face is farther from the reference point 50. The reflecting surfaces 20 may be located on the inclined faces of the Fresnel shape. If the reflecting surfaces 20 are positioned on the substantially perpendicular faces, the light reflected by the reflecting surfaces 20 may produce a moiré pattern. Moiré patterns or ghosts can be suppressed by the reflecting surfaces 20 being located only on the inclined faces. The reflecting surface 20 may be smaller in size than the predetermined width of the inclined face.

The virtual surface 140 may have another light collecting shape, such as a paraboloidal shape.

The reference point 50 may be determined so that light that is incident on the optical member 2 and specularly reflected at the reference point 50 is directed towards the light-collection region.

The optical member 2 according to the present embodiment can reflect at least a portion of incident light in a different direction than the direction of specular reflection by the substrate surface 110.

The optical member 2 according to the present embodiment may, for example, be provided on the front windshield of a moveable body. In this case, light projected onto the front windshield is reflected towards the driver of the moveable body, thereby allowing the driver to see a virtual image over a wider range of the front windshield. The driver can see the scenery in front of the front windshield by virtue of the optical member 2 being light-transmissive.

The optical member 2 according to the present embodiment may be provided as a display panel for digital signage. In this case, light projected onto the display panel is reflected in a particular direction, thereby allowing a virtual image to be displayed as an exclusive advertisement for a person at a particular position. The optical member 2 may be provided as a cover of a display panel for digital signage. When the display panel of the digital signage is an LCD display or the like, the virtual image can be displayed in overlap on the display content of the display. This configuration allows advertisements to be deployed more effectively.

The optical member 2 according to the present embodiment may be provided in a show window. In this case, the reflection of light projected onto the show window allows a virtual image to be displayed in overlap with the merchandise exhibited inside the show window. Light projected onto the show window is reflected in a particular direction, allowing content exclusive to a particular position to be displayed when the show window is viewed from the particular position. This configuration allows advertisements to be deployed more effectively.

An example method of manufacturing the optical member 2 is now described with reference to the flowchart in FIG. 7. A first substrate 11 having a first surface 111 and a second surface 112, as illustrated in FIG. 8, is used in the method of manufacturing according to the present embodiment. The first substrate 11 may be made of resin. The second surface 112 is opposite the first surface 111 and includes inclined faces inclined relative to the first surface 111. The shape of the second surface 112 may correspond to the virtual surface 140.

Figure 7:
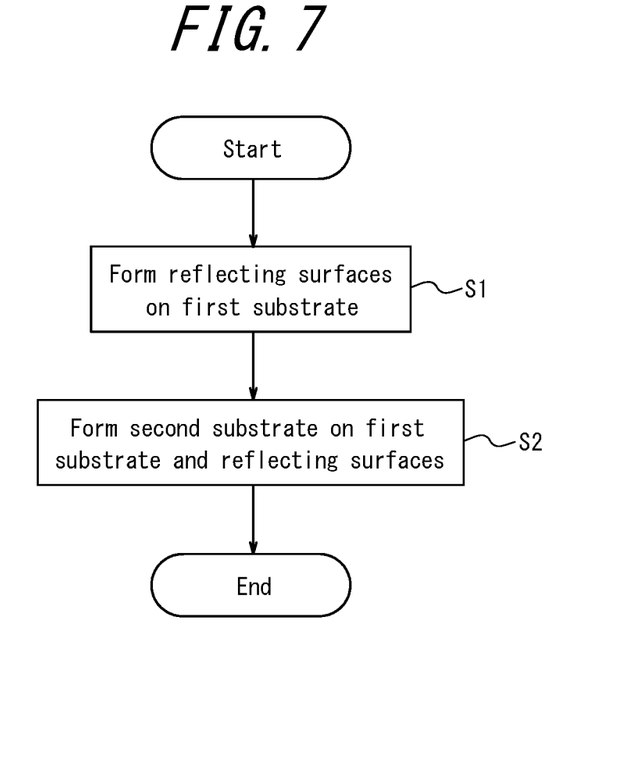
FIG. 7 is a flowchart illustrating an example method of manufacturing an optical member.
Figure 8:
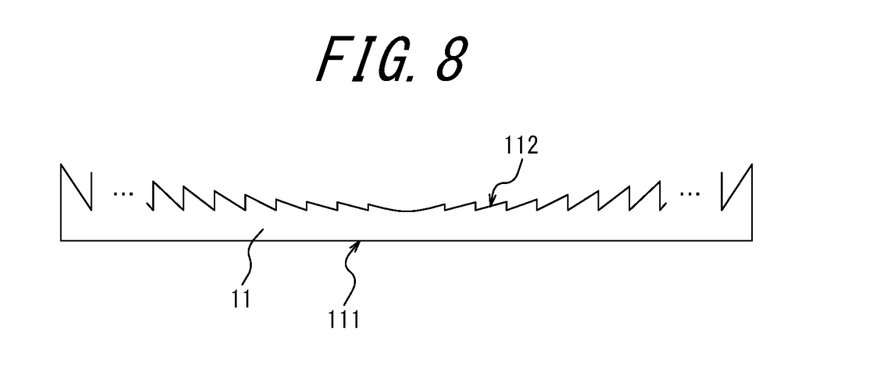
FIG. 8 illustrates an example method of manufacturing an optical member.
Figure 9:
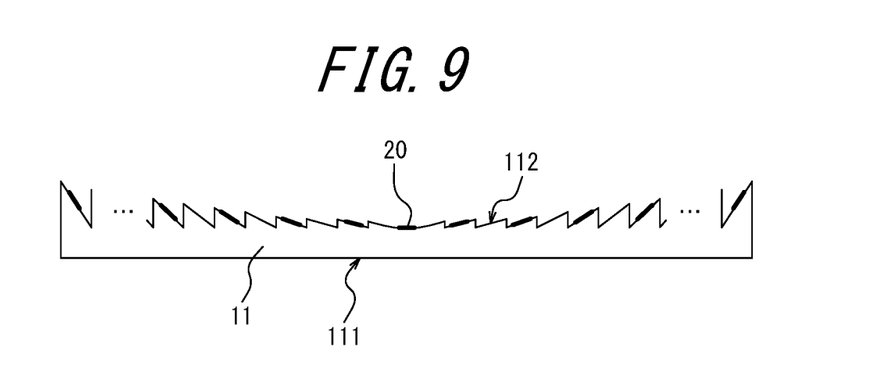
FIG. 9 illustrates an example method of manufacturing an optical member.

As illustrated in FIG. 9, a plurality of reflecting surfaces 20 are formed on a portion of the inclined faces of the second surface 112 of the first substrate 11 (step S1 of FIG. 7). The reflecting surfaces 20 may be formed by depositing a material capable of reflecting light. The reflecting surfaces 20 may be formed by depositing a metal material, such as aluminum, silver, or chrome. The reflecting surfaces 20 may be formed by various film deposition methods, such as sputtering, vacuum deposition, or molecular beam epitaxy (MBE).

The reflecting surfaces 20 may be formed by depositing material after placing a mask having a predetermined pattern on the second surface 112. The mask having a predetermined pattern may have openings through which the deposition material can pass at portions corresponding to the inclined faces of the second surface 112. The regions on the second surface 112 where the reflecting surfaces 20 are formed can be controlled by forming the reflecting surfaces 20 on the second surface 112 after placement of the mask. This approach can suppress unwanted moiré patterns, ghosts, or the like.

Figure 10:
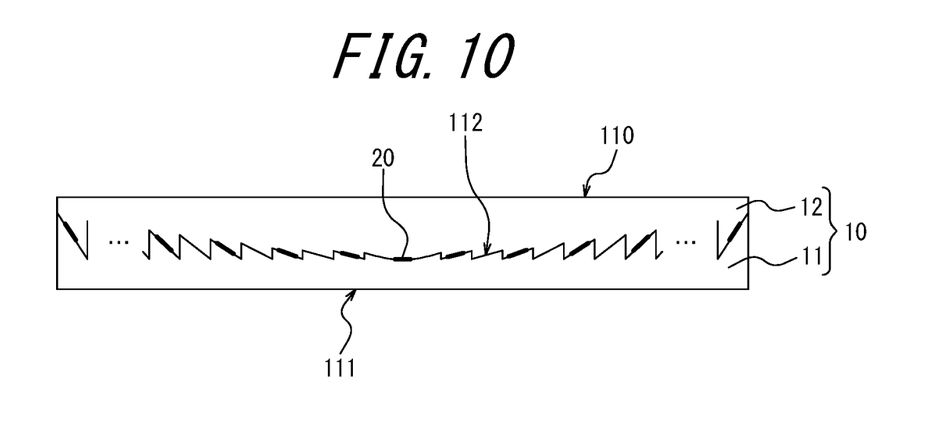
FIG. 10 illustrates an example method of manufacturing an optical member.

As illustrated in FIG. 10, a second substrate 12 is formed on top of the second surface 112 of the first substrate 11 and the plurality of reflecting surfaces 20 (step S2 of FIG. 7). This completes the example method of manufacturing the optical member 2 according to the present embodiment. The second substrate 12 may be made of resin. The second substrate 12 may be formed by packing resin onto the first substrate 11. The second substrate 12 may have a shape capable of fitting onto the second surface 112 of the first substrate 11 and may be adhered onto the second surface 112. The second substrate 12 may be made of the same material as the first substrate 11. The second substrate 12 may be formed to prevent defects such as gaps or joints between the first substrate 11 and the second substrate 12. This configuration can suppress the reflection of light between the first substrate 11 and the second substrate 12. An optical effect, such as the lens power of the second surface 112 of the first substrate 11, can be suppressed.

Second Embodiment

Figure 11:
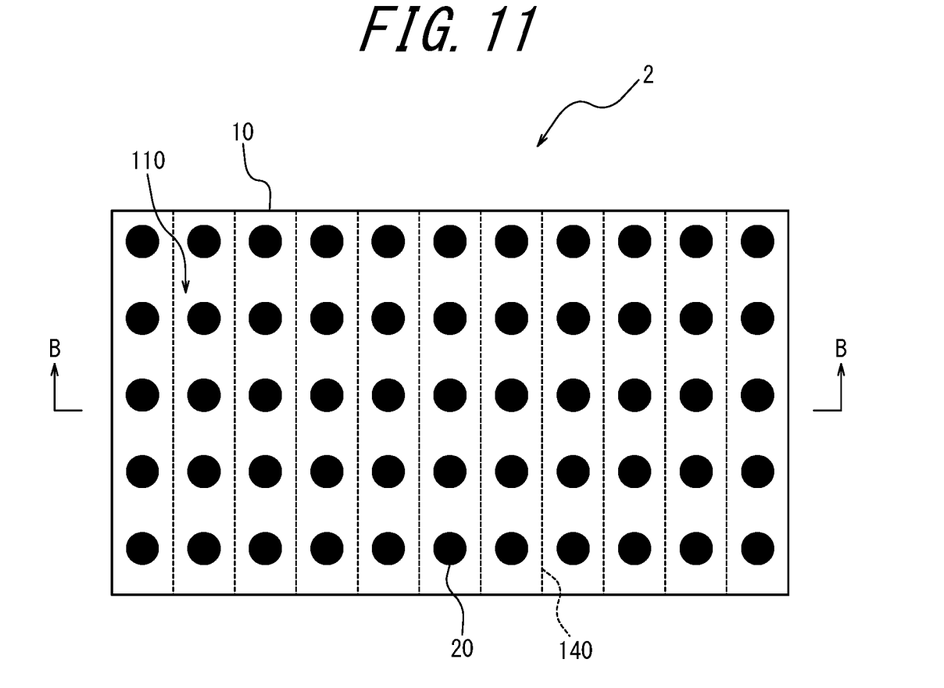
FIG. 11 is a plan view illustrating an example configuration of an optical member according to a second embodiment.
Figure 12:
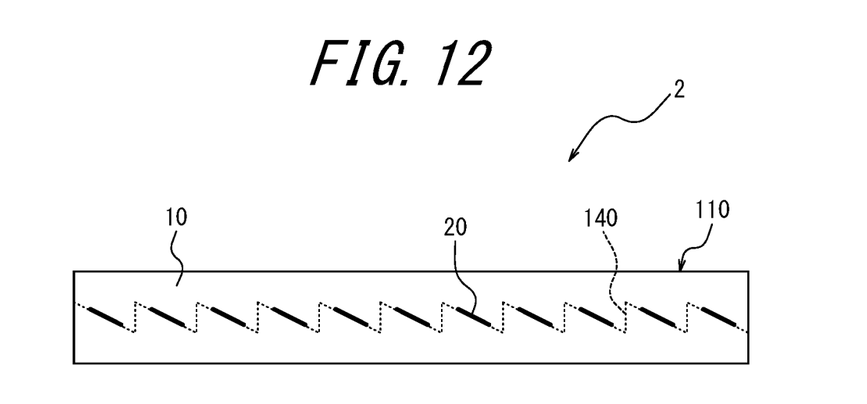
FIG. 12 is a cross-section along the B-B line in FIG. 11.

A virtual surface 140 virtually located on the optical member 2 according to the present embodiment may have a surface shape such that light incident on the substrate surface 110 is reflected in a different direction than the direction of specular reflection. As illustrated in FIG. 11, the virtual surface 140 may include a plurality of rectangular faces. As illustrated in FIG. 12, the cross-sectional shape of the virtual surface 140 may be a sawtooth shape including faces substantially perpendicular to the substrate surface 110 and inclined faces inclined at a predetermined angle relative to the substrate surface 110.

Reflecting surfaces 20 may be located on the inclined faces. In this case, light incident on the optical member 2 can be reflected in a direction different than the direction of spectral reflection with respect to the substrate surface 110.

The reflecting surfaces 20 may be positioned to be inclined at a constant angle relative to the substrate surface 110. This configuration allows control of the direction of light reflected by the optical member 2. The light whose direction of reflection is controlled by the optical member 2 according to the present embodiment can reach a wider range.

The optical member 2 according to the present embodiment may be provided in a display panel for digital signage, a show window, or the like. In this case, a virtual image in overlap with the content that is normally displayed or exhibited can be displayed in correspondence with the direction in which the digital signage, show window, or the like is viewed. Information can be provided more effectively by a virtual image being overlapped with the content of digital signage or a show window in correspondence with the viewing direction.

The image display system 1 according to the first and second embodiments can be implemented in a variety of devices. The image display system 1 may be implemented in a moveable body, a digital signage system, or a show window production system. The image display system 1 may also be implemented as a projection system. The image display apparatus 3 may, for example, be implemented as a projector.

The optical member 2 according to the first and second embodiments may be formed as a film substrate. This configuration allows the optical member 2 to be mounted onto a curved surface such as glass or a wall.

The term "moveable body" in the present disclosure includes vehicles, ships, and aircraft. The term "vehicle" in the present disclosure includes, but is not limited to, automobiles and industrial vehicles and may also include railway vehicles, vehicles for daily life, and fixed-wing aircraft that run on a runway. Automobiles include, but are not limited to, passenger vehicles, trucks, buses, motorcycles, and trolley buses, and may include other vehicles that travel on the road. Industrial vehicles include industrial vehicles for agriculture and for construction. Industrial vehicles include, but are not limited to, forklifts and golf carts. Industrial vehicles for agriculture include, but are not limited to, tractors, cultivators, transplanters, binders, combines, and lawnmowers. Industrial vehicles for construction include, but are not limited to, bulldozers, scrapers, backhoes, cranes, dump cars, and road rollers. The term "vehicle" includes human-powered vehicles. The vehicle is not limited to the above-listed types. For example, automobiles may include industrial vehicles that can drive on the road, and the same vehicle may be included in multiple categories. The term "ship" in the present disclosure includes marine jets, boats, and tankers. The term "aircraft" in the present disclosure includes fixed-wing aircraft and rotorcraft.

Configurations according to the present disclosure are not limited to the above embodiments, and a variety of modifications and changes are possible. For example, the functions and the like included in the various components may be reordered in any logically consistent way. Furthermore, components may be combined into one or divided.

The invention claimed is:

1. An optical member comprising:
a light-transmissive substrate including a substrate surface; and
a plurality of reflecting surfaces located inside the substrate, comprising at least a first reflecting surface and a second reflecting surface, and configured to reflect at least a portion of incident light, wherein
the first reflecting surface is inclined at a first angle relative to the substrate surface,
the second reflecting surface is inclined at a second angle relative to the substrate surface, the second angle being different from the first angle,
each of the plurality of reflecting surfaces is located only on a respective inclined face inside the light-transmissive substrate,
each of the plurality of reflecting surfaces is inclined at an angle that gradually increases in accordance with a distance of the respective reflecting surface from a center of the optical member,
an inclination of each of the plurality of reflecting surfaces relative to the substrate surface corresponds to a virtual surface shape inside the substrate, and
the virtual surface shape is a Fresnel shape including a plurality of annular surfaces that surround a predetermined reference point on the substrate surface, such that
a first portion of the light incident on the optical member is reflected along a direction of specular reflection of the optical member, a second portion of the light incident on the optical member is reflected in a direction other than along the direction of specular reflection, and a third portion of the light incident on the optical member is transmitted through the optical member.

2. The optical member of claim 1, wherein
each of the plurality of reflecting surfaces is smaller than a width of an inclined face of the Fresnel shape.

3. The optical member of claim 1, wherein
an inclination of each of the plurality of reflecting surfaces relative to the substrate surface corresponds to a virtual surface shape inside the substrate, and the virtual surface shape is configured to reflect at least a portion of the incident light in a predetermined direction.

4. A method of manufacturing the optical member according to claim 1, the method comprising:
preparing a first substrate including a first surface and a second surface, the second surface being opposite to the first surface and including inclined faces which are inclined at different angles relative to the first surface; and
forming a plurality of reflecting surfaces on respective ones of the inclined faces, the plurality of reflecting surfaces being configured such that at least a portion of the incident light on the plurality of reflecting surfaces is reflected and collected; and
forming a second substrate on top of the second surface of the first substrate and the plurality of reflecting surfaces to form the optical member of claim 1.

5. The method of manufacturing an optical member of claim 4, wherein the forming the plurality of reflecting surfaces comprises
placing a mask having a predetermined pattern on the second surface and depositing a material to form the reflecting surfaces on a portion of the inclined face.

6. The method of manufacturing an optical member of claim 5, wherein
the second substrate comprises the same material as the first substrate.

7. The method of manufacturing an optical member of claim 4, wherein
the second substrate comprises the same material as the first substrate.

8. An image display system comprising:
the optical member according to claim 1; and
an image display apparatus configured to emit image projection light onto the optical member to display a virtual image.

9. The image display system of claim 8, wherein
an inclination of each of the plurality of reflecting surfaces relative to the substrate surface corresponds to a virtual surface shape inside the substrate, and the virtual surface shape is configured to collect at least a portion of the incident light.

10. The image display system of claim 9, wherein
each of the plurality of reflecting surfaces is smaller than a width of an inclined face of the Fresnel shape.

11. The optical member of claim 1, further comprising a third reflecting surface inclined at a third angle, wherein
the first reflecting surface is closer to a center of the optical member than the second reflecting surface,
the second reflecting surface is closer to the center of the optical member than the third reflecting surface,
the first angle is smaller than the second angle, and
the second angle is smaller than the third angle.

12. The optical member of claim 1, wherein
each of the plurality of reflecting surfaces is positioned on the respective inclined face so as not to straddle a peak or valley of a virtual surface in the light-transmissive substrate.

13. The optical member of claim 1, wherein
each of the plurality of reflecting surfaces is smaller in size than a predetermined width of the respective inclined face.

\* \* \* \* \*